United States Patent [19]

Kulberg et al.

[11] 4,153,151
[45] May 8, 1979

[54] DEVICE FOR ARRANGING FERROMAGNETIC COMPONENTS AT PRESET DISTANCE FROM ONE ANOTHER

[75] Inventors: Anton Y. Kulberg; Robert K. Kalnin; Benyamin A. Ioffe, all of Riga; Semen K. Litvinenko; Roman S. Leikin, both of Kurgan, all of U.S.S.R.

[73] Assignees: Institut Fiziki Akademii Nauk Latviiskoi SSR, Latviiskaya; Rizhsky Politekhnichesky Institut, Riga, both of U.S.S.R.

[21] Appl. No.: 785,054

[22] Filed: Apr. 6, 1977

[51] Int. Cl.² ........................................... B65G 35/00
[52] U.S. Cl. ................................. 198/456; 198/459; 198/619; 221/156; 221/212
[58] Field of Search ............... 198/619, 381, 459, 456; 221/212, 156, 171; 310/12, 13, 14; 271/18.1, 193, DIG. 3

[56] References Cited

U.S. PATENT DOCUMENTS

| 3,537,580 | 11/1970 | Beroset | 198/619 X |
| 3,741,436 | 6/1973 | Hartline et al. | 221/212 X |
| 3,989,164 | 11/1976 | Hager | 221/212 |

Primary Examiner—Robert B. Reeves
Assistant Examiner—Douglas D. Watts
Attorney, Agent, or Firm—Lackenbach, Lilling & Siegel

[57] ABSTRACT

A device for arranging ferromagnetic components a preset distance from one another including an electromagnet defining a pole gap wherein a nonuniform attractive magnetic field is formed with a gradient directed along its axis of symmetry. At least one of the pole pieces of the electromagnet is provided with a ferromagnetic rack adapted to move in the plane in which it lies. The plane of the rack is substantially normal to the direction of the magnetic field gradient. The rack includes teeth which are spaced apart in accordance with a desired preset distances between ferromagnetic componets. The device also comprises a means for feeding ferromagnetic components into the magnetic field, in the direction of its gradient.

6 Claims, 8 Drawing Figures

DEVICE FOR ARRANGING FERROMAGNETIC COMPONENTS AT PRESET DISTANCE FROM ONE ANOTHER

The present invention relates to automation of manufacturing processes involving assembly, completion and conveying of forromagnetic components, and more particularly to devices for arranging ferromagnetic components at a preset distance from one another for subsequent completion or assembly of the components with appropriately space components of another type (e.g. for assembling components of the "bolt-washer" type).

It is well known that ferromagnetic components can be spaced a certain interval apart, for example, on electromagnetic plates, or arranged with a certain orientation on surfaces provided with magnets. In this case, however, components have to be magnetized, first, in a certain manner and, in addition, such devices are not suitable for arranging components continuously supplied by a feeder.

In another known device, alternately energized electromagnets are used to separate flat ferromagnetic bodies, for example, rolled sheets, from a stack of sheets prepared in advance and conveying them upwards one by one. Evidently, after the first body has been lifted, another one can follow suit after a certain period of time, and so on. Thus, this prior art device can be used for conveying batches of components at a time spaced a certain interval apart. In this case, the interval between batches corresponds to the double distance between pairs of electromagnets. The device is cumbersome and cannot provide for a fixed interval between components since it operates on the principle of alternate energizing of electromagnets. In addition, the conveying electromagnets obstruct access to individual components except for the uppermost one and do not make it possible to extract them from a batch to be conveyed to a respective work station. For components of a more intricate shape, such as toothed bevel washers and the like, the device is not suitable at all.

Still another device is known for arranging ferromagnetic components, namely, rods, at a preset distance from one another during loading into magazines. It comprises an electromagnet provided with a means (additional winding) for creating in the pole gap a nonuniform attractive magnetic field whose gradient is directed along the axis of symmetry of the field, and a feeding means (shaking trough) whose exit end is located in the magnetic field near said axis of symmetry for components to be introduced into the magnetic field in the direction of the gradient. The arrangement of ferromagnetic rods at a preset distance from one another is ensured by their being directed into the sockets of magazines introduced into the magnetic field. However, components may or may not find their way into the magazine socket since a definite interval between components cannot be maintained. This device is not suitable for arranging flat components with protrusions, teeth, etc. of irregular size.

It is an object of the invention to provide a device for arranging ferromagnetic components at a preset spaced distance from one another with the required interval therebetween being properly fixed.

Another object of the invention is to provide a device ensuring free access to ferromagnetic components arranged at a preset distance from one another.

Still another object of the invention is to provide a device for arranging both ferromagnetic rods and flat components of intricate shape at a preset distance from one another.

Yet another object of the invention is to simplify the structure and enhance the reliability of such a device.

These objects are attained by that in a device for arranging ferromagnetic components at a preset distance from one another, comprising an electromagnet provided with a means for creating a nonuniform attractive magnetic field whose gradient is directed along the axis of symmetry of the pole gap, and a means for feeding ferromagnetic components, the exit end whereof is disposed in the magnetic field near the axis of symmetry of the pole gap for components to be introduced into the magnetic field in the direction of the field gradient, according to the invention, at least one of the pole pieces, near the exit end of the feeding means, is provided with a ferromagnetic rack lying in a plane almost normal to the direction of the magnetic field gradient and adapted to move in that plane, the teeth of the rack being spaced apart in accordance with the preset distances between ferromagnetic components.

It is expedient to select the distance between the exit end of the feeding means and the plane in which the rack lies equal to almost half the size of a component.

The device should desirably be provided with a means for exerting on the components that have reached the exit end of the feeding means an additional force directed opposite to the magnetic field gradient, and the electromagnetic should preferably be provided with a means for measuring the magnetic field intensity.

The additional force exerting means can be provided by a vertical position of the exit end of the feeding means, said additional force exerted upon the ferromagnetic components being the force of gravity.

The device for arranging ferromagnetic components at a preset distance from one another, according to the invention, permits noncontact arrangement of components with the interval therebetween being reliably fixed, as well as allows components to be conveyed; it is suitable for manipulating both rods and flat components of intricate shape, i.e. with lugs, teeth, etc. Therewith, individual components are accessible for whatever operation may be required (for example, when the whole batch of components is taken away with the interval there between being maintained or when components of other types are fed thereto for assembly, etc.).

The proposed device is reliable in operation, simple in structure and can be used in automatic lines for machining and assembling ferromagnetic components. The device is also suitable for feeding components in an intermittent manner, for example, by means of shaking troughs.

The invention will now be described in greater detail with reference to preferred embodiments thereof, taken in conjunction with the accompanying drawings, wherein.

Figure 1:
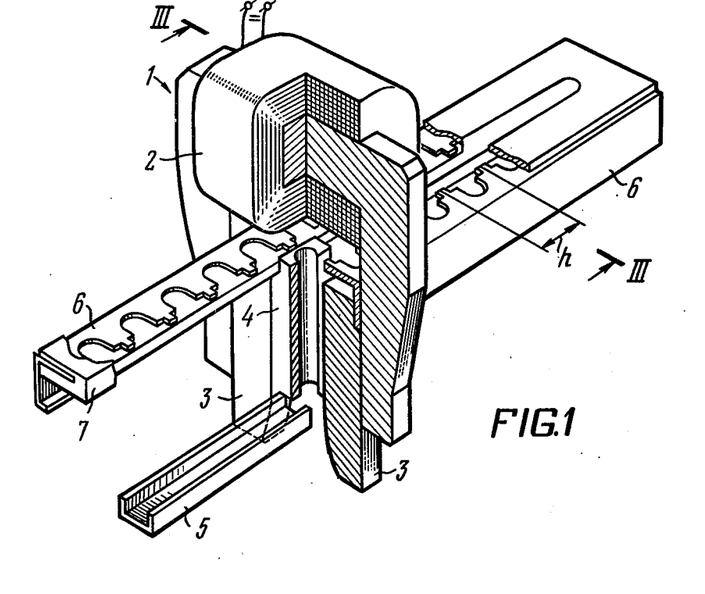
FIG. 1 is a partially cut isometric view of a device for arranging ferromagnetic components at a preset distance from one another, according to the invention.

Referring to FIG. 1, there is shown a device for arranging ferromagnetic flat components of the gasket type at a preset distance from one another, comprising an electromagnet 1 with a magnetizing winding 2. Pole pieces 3 of the electromagnet 1 are made profiled and define a narrowing pole gap accommodating, along its axis of symmetry, a magazine 4 made from a nonmagnetic material. The exit portion of a feeding means 5 communicates with the exit port of the magazine 4 (the exit portion of the feeding means forming, together with the magazine's exit port, what will be referred to as the exit end of the feeding means) for components (not shown in FIG. 1) to be introduced into the magnetic field of the electromagnet 1. Near the exit port of the magazine 4, the pole pieces 3 are provided, each, with a ferromagnetic rack 6. The racks 6 are so arranged that the planes in which they lie are normal to the axis of symmetry of the pole gap and are adapted to move in these planes relative to the exit port of the magazine 4 in a direction along their length. The teeth of the racks 6 are spaced apart by intervals "h" selected according to the present distances between the ferromagnetic components. The racks 6 are provided with distance pieces 7 made from a nonmagnetic material.

Figure 2:
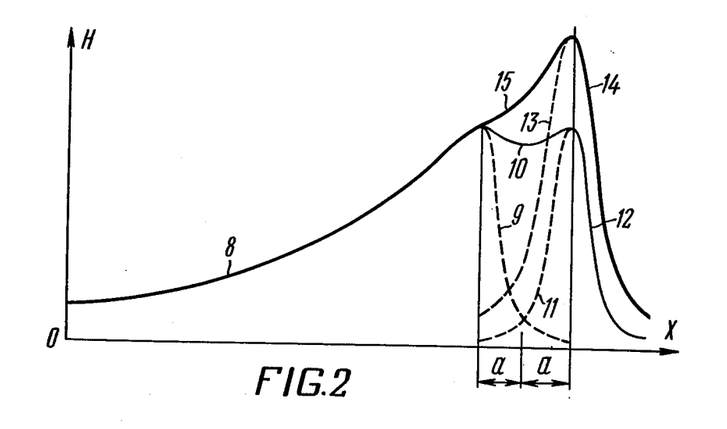
FIG. 2 shows the distribution of the magnetic field intensity along the axis of symmetry of the pole gap.

FIG. 2 shows the distribution of intensity H of the magnetic field of the electromagnet 1 (FIG. 1) in the pole gap along axis OX of symmetry.

Figure 3:
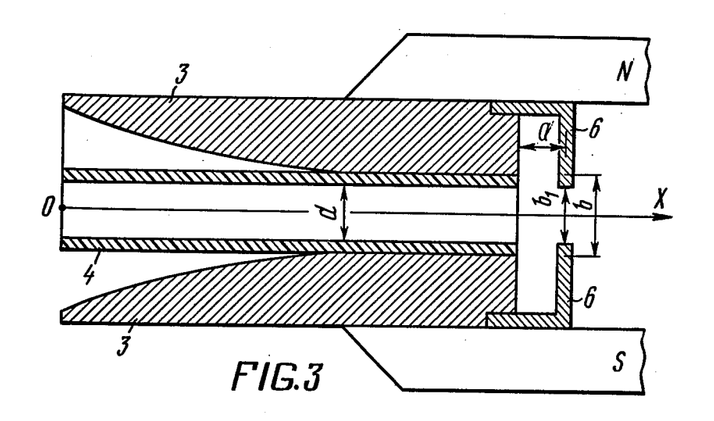
FIG. 3 is a section view taken along line III—III of FIG. 1.

FIG. 3 is a section view taken along line III—III of FIG. 1, in which axis OX of symmetry of the pole gap corresponds to axis OX of abscissae in FIG. 2. The movable racks 6 are placed at distance "a" from the exit port of the magazine 4. The distance "a" is selected equal to almost half the diameter ("d") of the magazine 4, which is slightly greater than the maximum component size. Portions of the curves shown in FIG. 2 are labelled 8, 9, 10, 11, 12, 13, 14 and 15 in respective intervals of argument "x". Therewith, the portions 8 and 9 taken together represent the distribution of the intensity H in the pole gap of the electromagnet 1 only in the presence of the profiled pole pieces 3 (the teeth of the racks 6 near the exit port of the magazine 4 are absent).

The curve portions 11 and 12 represent, together, a variation in the magnetic intensity H in the pole gap defined only by the teeth of the racks 6. The maximum of this characteristic is determined by width "b" of the gap between a pair of opposite teeth of the racks 6. The narrower the gap, the higher the maximum. The curve portions 13 and 14 represent a variation in the magnetic intensity H in the pole gap defined by the teeth of the racks 6 in the case where the gap is reduced to value $b_1 = d$.

Figure 4:
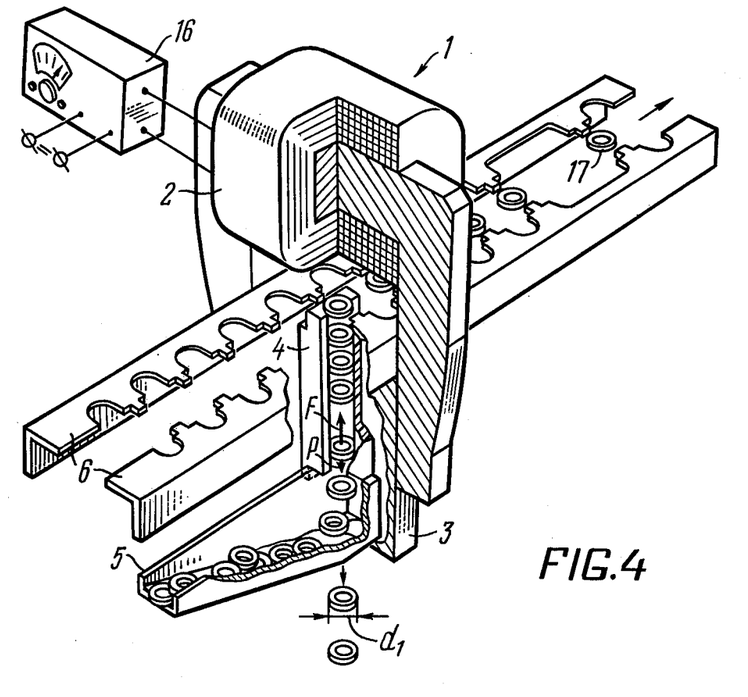
FIG. 4 is a partially cut isometric view of a device for arranging components, with a means for varying the magnetic field intensity, according to the invention.

The curve including the portions 8, 10 and 12 represents a variation in the magnetic intensity H in the pole gap in the presence of the profiled pole pieces 3 and teeth of the racks 6, the width of the gap between the teeth being equal to "b". The curve including the portions 8, 15 and 14 represents the same as the previous curve except that the gap width is $b_1 = d$.

turnig Turning to FIG. 4, there is shown a device similar to that of FIG. 1 with the difference that it is provided with a means 16 for varying the magnetic field intensity in the pole gap of the electromagnet 1. In this embodiment, the means 16 is an automatic switch periodically changing the current through the winding 2 of the electromagnet 1.

The switch may use a thyristor circuit controlled by an asymmetrical multivibrator.

The means for varying the magnetic field intensity in the pole gap of the electromagnet 1 may also be in the form of a magnetic shunt (not shown) which periodically, for short periods of time, shunts the pole gap of the electromagnet 1, thereby providing for periodical variation in the magnetic force attracting or pulling components 17.

The magazine 4 whose diameter d is slightly greater than the maximum diameter $d_1$ of comonents 17 is positioned vertically, whereby, in addition to the magnetic force F, the components 17 in the magazine 4 are acted upon by force P of gravity in an opposite direction.

The additional force P may also be an aerodynamic or a centrifugal force.

Figure 5:
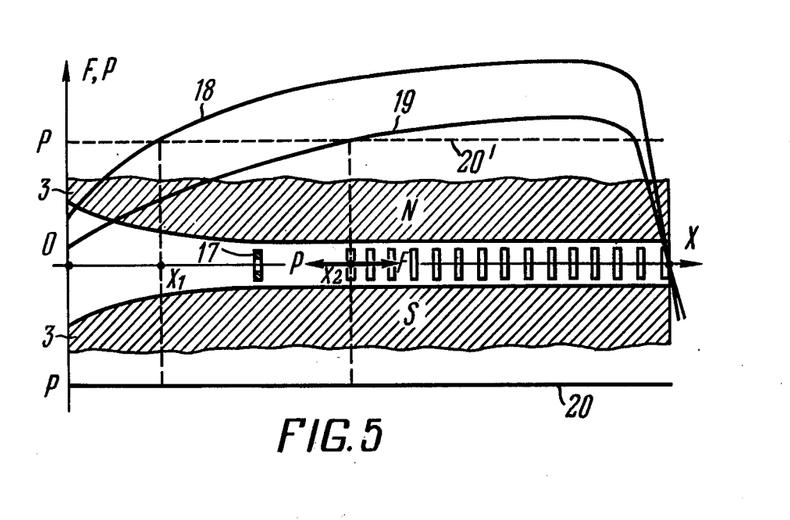
FIG. 5 shows the relationships between the magnetic field intensity variations and those of the additional force exerted upon a component in the pole gape and the component is position.

Lines 18, 19 and 20 in FIG. 5 represent variations in the magnetic force F and the magnitude of the additional force P, both acting upon a ferromagnetic component 17 as it moves in the pole gap of the electromagnet 1 (FIG. 4). Dashed line 20' represents the mirror image of the line 20 relative to the axis OX.

For clarity, FIG. 5 also shows the profiled pole pieces 3 (N and S). The axis X of abscissae coincides with the axis of symmetry of the pole gap, while plotted along the ordinates in relative units are the forces F and P.

The lines 18 and 19 represent variations in the magnetic force F at current intensities $I_1 > I_2$, respectively, in the magnetizing winding 2 of the electromagnet 1 (FIG. 4). The line 20 indicates the additional force P of invariable magnitude, acting upon the components 17.

Figure 6:
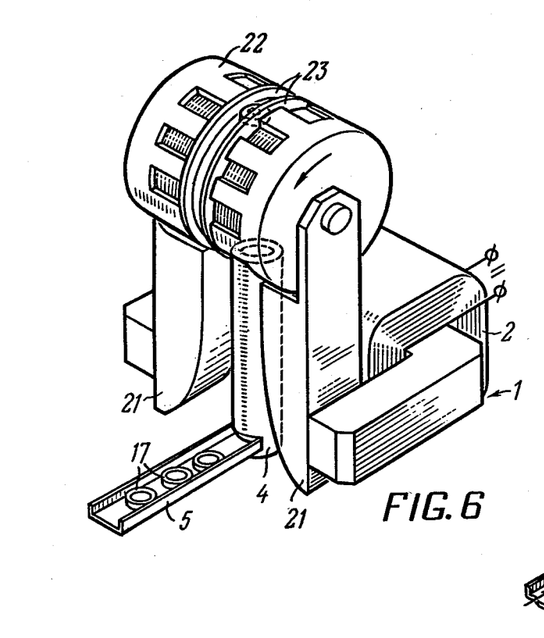
FIG. 6 is an isometric view of a device for arranging components, provided with a cylindrical ferromagnetic rack, according to the invention.

FIG. 6 shows an embodiment of the present invention, in which profiled pole pieces 21 are secured at a right angle to the plane of the magnetic circuit of the electromagnet 1, and cylindrical ferromagnetic racks 22 provided with distance pieces 23 are mounted on the pole pieces 21 and adapted to rotate about their axes of symmetry.

Figure 7:
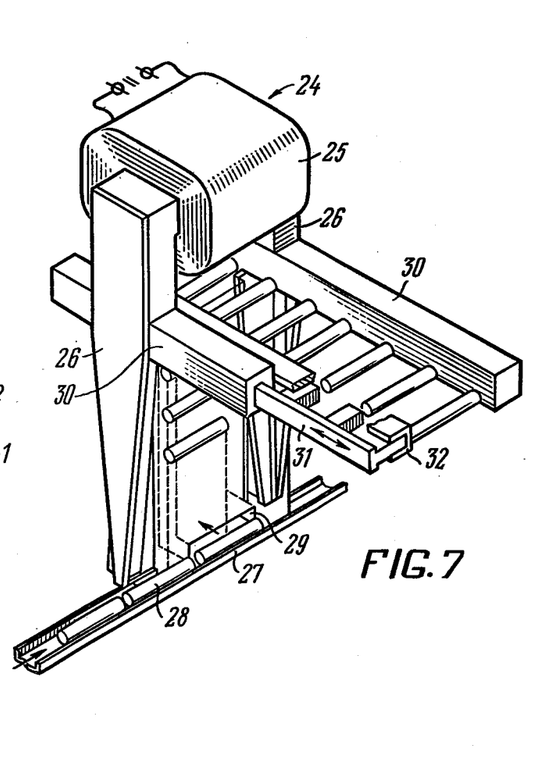
FIG. 7 is an isometric view of a device for arranging rods, according to the invention.

Shown in FIG. 7 is an embodiment of the present invention for arranging rods. This device comprises an electromagnet 24 with a magnetizing winding 25, provided with a means for forming a narrowing pole gap and profiled pole pieces 26. Disposed in proximity to the free ends of the pole pieces 26 is a trough 27 for feeding ferromagnetic rods 28 into a magazine 29 located in the pole gap along its axis of symmetry. Ferromagnetic bars 30 are mounted perpendicularly to the pole pieces 26 near the exit end of the magazine 27. One of the bars 30 is made sectional and provided with a ferromagnetic rack 31 adapted to reciprocate along the bar 30 and having a distance piece 32 from a nonmagnetic material to prevent sticking of components 28 to its teeth.

Figure 8:
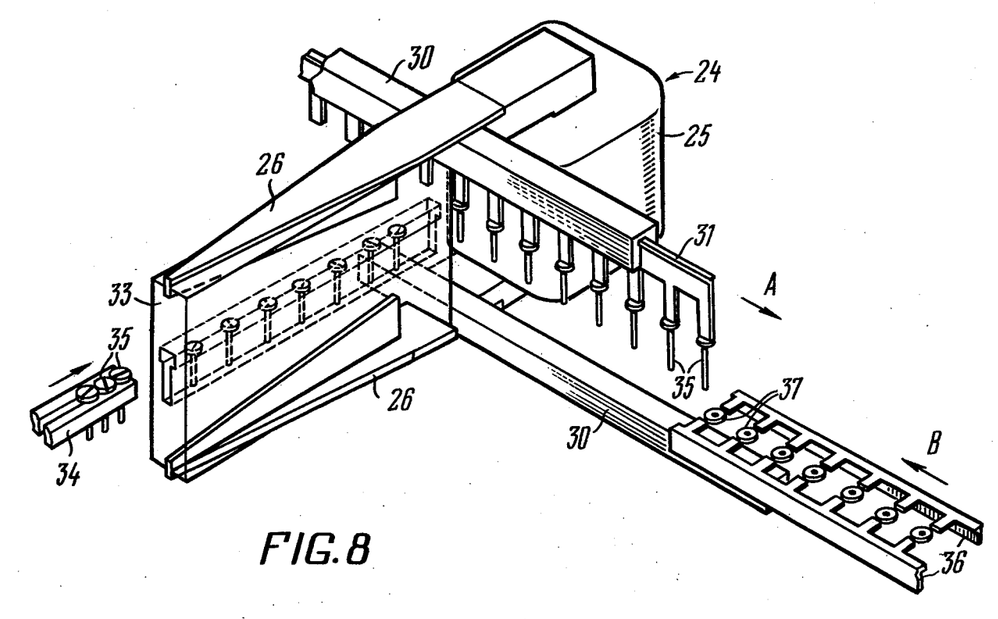
FIG. 8 is an isometric view of a device for mutual arrangement of components to be assembled into units of the "bolt-washer" type, according to the invention.

FIG. 8 represents still another embodiment of the present invention for arranging components of the bolt and washer types and assembling them together. Such mutual arrangement of components of different types is required in batch assembly.

The pole gap of the electromagnet 24 with the profiled pole pieces 26 and bars 30 one of which is provided with a rack 31 movable in the direction of arrow A accommodates a magazine 33 for components 35 of the bolt type. The components 35 are fed to the exit end of the magazine 33 by a shaking trough 34. Racks 36 movable in the direction of arrow B are part of another device of the type shown in FIG. 4 (the racks 36 correspond to the racks 6 in FIG. 4). Components 37 of the washer type are arranged between the teeth of the racks 36. The distance between the bars 30 is selected long enough for the racks 36 with the components 37 to move in the space between a bar 30 and the free ends of the components 35 arranged between the teeth of the rack 31. The components 35 and 37 are equally spaced apart.

The device illustrated in FIG. 1 operates as follows.

The magnetizing winding 2 of the electromagnet 1 is connected to a dc source (not shown), and a magnetic field is created in the pole gap of the electromagnet 1, whose gradient is directed along the axis of the magazine 4. Ferromagnetic components fed by the trough of the means 5 are attracted by this magnetic field into the magazine 4 in which a pile of spaced components is formed. The components being spaced a certain interval apart is due to their polarization in the magnetic field. When the racks 6 move synchronously so that the teeth of one rack face those of the other rack, the component nearest to the plane in which the racks 6 lie passes from the magazine 4 to the area in which the magnetic flux is additionally closed between the opposite teeth of the racks 6, i.e. to the area of higher magnetic field intensity, and is captured by the teeth in a fixed position As the racks 6 keep moving, the next ferromagnetic component from the magazine 4 is set level with that captured by the teeth of the racks 6 owing to the nonuniformity of the magnetic field in the pole gap and is, in turn, captured by the next pair of teeth of the racks 6. The presence of the distance pieces 7 from a nonmagnetic material prevents a pair of teeth from capturing more than a single component.

The operation of the device of FIG. 1 is further elucidated by the graphs of FIG. 2. The racks 6 being in a position when no teeth of the racks 6 are present above the exit port of the magazine 4, the magnetic field in the pole gap of the electromagnet 1 is distributed as shown in the graph with curve portions 8 and 9. In this case, the first component of a batch in the magazine 4 occupies a position corresponding to the maximum of the curve (portions 8 and 9). As the racks 6 move, their teeth appear near the exit port of the magazine 4 and cause a variation in the initial distribution of the intensity H of the magnetic field along the axis OX of symmetry. As can be inferred from the graphs one of which includes portions 11, 12 and the other, portions 13, 14, the teeth of the racks 6, differing in length, are responsible for different local distributions of the field in the space between the teeth. Therewith, the magnetic intensity H in that space increases as the distance between opposite teeth becomes narrower ($b_1 < b$). The resulting distribution of the magnetic field in the pole gap of the electromagnet 1 is represented by the graph including portions 8, 15 and 14. In accordance with this graph, the first component in the magazine 4 is moved by the magnetic forces from a position determined by a local maximum of the curve formed by portions 8 and 9 to the space confined by the teeth of the racks 6, into the area of maximum magnetic intensity H (curve 8, 15, 14). The component is fixed in this position and moves together with the racks 6.

The device of FIG. 4 operates in a similar manner as that of FIG. 1. The difference between these devices is that the intensity of the current through the magnetizing winding 2 of the electromagnet 1 of the device shown in FIG. 4 is periodically changed by the means 16 which is so designed that the intensity of the current through the winding 2 is almost all the time maintained at level $I_1$ and, periodically, for short periods of time, is brought down to level $I_2 < I_1$. Owing to the vertical position of the magazine 4, the components 17 stacked therein are acted upon by both the attractive magnetic force F and the oppositely directed force P of gravity.

These two features render this embodiment efficient even under conditions when the average rate of feed of components 17 by the trough 7 is greater than the average speed of entrainment of the components by the racks 6, as well as when the components 17 are fed irregularly.

The operation of the embodiment of FIG. 4 will become more clear when considered with reference to the graphs of FIG. 5. Curve 18 which relates to the case where current $I_1$ flows through the magnetizing winding 2 of the electromagnet 1 suggests that the magnetic force F lifting the components 17 through the magazine 4 is greater in absolute value than the force P of gravity (line 20'), along the axis OX from point $X_1$ onwards. In the case where current $I_2 < I_1$ flows through the winding 2 (curve 19), the magnetic force F exceeds the force P gravity over the pole gap portion along the axis OX from point $X_2$ onwards. The trough 7 (FIG. 4) feeds the components 17 to the magazine 4 into the area between points $X_1$ and $X_2$. At the moments when current $I_1$ flows through the winding 2 of the electromagnet 1 (curve 18), the arrived components 17 go up in the magazine 4 and form a stack of spaced components. Evidently, the device operating normally without any periodical weakening of the magnetic force F, the average rate of feed of components 17 and the speed of their movement from the magazine 4 coincide. If the speed of the components 17 coming out of the magazine 4 is lower than the rate of their feed thereinto, they will jam at the entrance to the magazine 4 and thereinside. Periodical reduction of the current through the winding 2 of the electromagnet 1 for short periods of time down to $I_2 = 0.3 - 0.8 I_1$ ensures reliable operation of the device when the average rate of feed of components 17 is higher than the speed of theirwithdrawal from the magazine 4.

Analysis of the graphs of FIG. 5 indicates that at a moment when the current through the magnetizing winding 2 is brought down to $I_2$, the stack of components 17, fed by the trough 7, in the magazine 4 ceases to grow, while some of the "surplus" components 17 are separated from the stack, falling down under the action of the force P of gravity. Thus, jamming of the magazine 4 with components 17 is prevented when the rate of feed of components 17 differs from the speed of their withdrawal from the magazine 4. This feature of the device under consideration is particularly advantageous when components are fed intermittently by such means as vibrating hoppers, hook feeders, etc.

The principle of operation of the device of FIG. 6 is similar to that of the devices shown in FIGS. 1 and 4. The racks 22 being cylindrical, their rotation about a common axis provides for continuous withdrawal of componets 17 from the trough 5 one by one through the magazine 4, as well as their arrangement along a circumference at preset intervals. This embodiment is intended for cases where components 17 are fed into the magazine 4 and withdrawn therefrom at the same speed.

The device of FIG. 7 is designed for arranging ferromagnetic rods 28 which are fed to the magazine 29 by means of the shaking trough 27. Under the action of the nonuniform magnetic field of the electromagnet 24, components 28 accumulate in the magazine 29 forming a stack of spaced components. When the rack 31 moves in the direction indicated by the arrow, individual components 28 are separated by the magnetic force from the stack and fixed in positions in front of the teeth of the movable rack 31.

As a result of the rack 31 moving forward in the space confined by the bars 30, a batch of components 28 is prepared. In this case, components 28 are in mechanical contact only with the nonmagnetic distance piece 32; the other ends of the components 28 do not touch the bars 30, which is ensured by appropriately spacing the bars 30 apart.

The device illustrated in FIG. 8 is intended for matching two batches of different types of components 35 and 37. A batch of components 35 of the bolt type is formed by means of a device of the type shown in FIG. 7. The batch of components 35 spaced a certain interval apart is shifted, as the rack 31 moves in the direction of arrow A, towards a batch of components 37 of the washer type. The latter batch is formed by another device similar to those shown in FIGS. 1 or 4. Actually FIG. 8 does not show the entire device for preparing a batch of components 37; it shows only a pair of racks 36, which moves the batch of components 37 arranged between the rack teeth in the direction of arrow B. After the above movements have been completed, the batch of components 37 is positioned above the batch of components 35.

After the components 35 and 37 have been matched, they can be sent for being assembled together.

What is claimed:

1. A device for arranging ferromagnetic components a preset distance from one another, comprising: an electromagnet and at least two pole pieces defining an elongated symetrical pole gap having an axis of symmetry, said electromagnetic being provided with a means for creating in said pole gap a nonuniform attractive magnetic field whose gradient is directed along said axis of symmetry of said pole gap, a component feeding means whose exit end is disposed in said magnetic field near said axis of symmetry of said pole gap, said component feeding means adapted for feeding said ferromagnetic components in the direction of said gradient of said magnetic field, a ferromagnetic rack moveably mounted on at least one of said pole pieces near said exit end of said feeding means so that the plane in which said rack lies is substantially normal to the direction of said magnetic field gradient, said rack being mounted to move in said plane and including a plurality of teeth which are spaced a preset distance, whereby said ferromagnetic components are maintained at the location of said teeth by magnetic force without said teeth engaging said components, and said components are transported by movement of said rack in a preset spaced relationship.

2. A device as claimed in claim 1, wherein the distance between said exit end of said feeding means and said plane of said rack is approximately equal to half the maximum overall size of said ferromagnetic components.

3. A device as claimed in claim 1 further including a means for exerting upon said components at said exit end of said feeding means a force directed opposite to said magnetic field gradient, and said electromagnet being provided with a means for varying the intensity of said magnetic field.

4. A device as claimed in claim 3, wherein said exit end of said component feeding means, and said magnetic field gradient are disposed substantially vertically, and said additional force is created by the action of gravity upon said components.

5. A device as claimed in claim 4, wherein each pole piece has at least one ferromagnetic rack slidably mounted on said pole pieces near said exit end of said feeding means so that the plane in which each rack lies is substantially normal to the direction of said magnetic field gradient, said racks being mounted parrallel to and spaced from each other such that said teeth on each rack are opposing and separated the same corresponding preset distances whereby said opposing corresponding teeth serve to hold said ferromagnetic components therebetween.

6. A device as claimed in claim 5, further including a nonmagnetic spacer member covering the outermost surfaces of said teeth.

* * * * *